(12) United States Patent
Rai et al.

(10) Patent No.: US 8,164,777 B2
(45) Date of Patent: Apr. 24, 2012

(54) METHOD AND APPARATUS FOR MODELING PRINT JOBS

(75) Inventors: Sudhendu Rai, Fairport, NY (US); Yuri Gartstein, Webster, NY (US)

(73) Assignee: Xerox Corporation, Norwalk, CT (US)

(*) Notice: Subject to any disclaimer, the term of this patent is extended or adjusted under 35 U.S.C. 154(b) by 32 days.

(21) Appl. No.: 12/357,425

(22) Filed: Jan. 22, 2009

(65) Prior Publication Data

US 2009/0128856 A1 May 21, 2009

Related U.S. Application Data

(63) Continuation of application No. 10/052,505, filed on Feb. 1, 2002, now abandoned.

(51) Int. Cl.
*G06F 3/12* (2006.01)
*G06K 15/00* (2006.01)

(52) U.S. Cl. ........ 358/1.15; 358/1.13; 358/1.16

(58) Field of Classification Search ............ None
See application file for complete search history.

(56) References Cited

U.S. PATENT DOCUMENTS

| | | | |
|---|---|---|---|
| 5,287,194 A * | 2/1994 | Lobiondo | 358/296 |
| 6,279,009 B1 | 8/2001 | Smirnov et al. | |
| 6,348,971 B2 * | 2/2002 | Owa et al. | 358/1.15 |
| 6,662,199 B1 | 12/2003 | Flight et al. | |
| 7,065,567 B1 | 6/2006 | Squires et al. | |
| 7,079,266 B1 | 7/2006 | Rai et al. | |
| 2003/0030832 A1 * | 2/2003 | Lea | 358/1.13 |
| 2003/0041765 A1 * | 3/2003 | Hill | 101/484 |
| 2003/0095281 A1 * | 5/2003 | Parry | 358/1.15 |

* cited by examiner

*Primary Examiner* — Vincent Rudolph
(74) *Attorney, Agent, or Firm* — Fay Sharpe LLP

(57) ABSTRACT

A system and method for modeling print jobs provides a central server that is accessible to remotely located print shops. The remote print shops are able to communicate with the central server to forward print job parameters and to receive the output from a modeling program to enable the print shop to run "what-if" scenarios to maximize print shop efficiency. The central server is also provided with various other print shop tools to assist with print shop design and organization.

22 Claims, 3 Drawing Sheets

METHOD AND APPARATUS FOR MODELING PRINT JOBS

CROSS REFERENCE TO RELATED APPLICATION

This is a Continuation application of U.S. application Ser. No. 10/052,505, filed Feb. 1, 2002, now abandoned now U.S. Publication No. 20030149747, published Aug. 7, 2003, by the same inventors, and claims priority therefrom.

BACKGROUND OF THE INVENTION

1. Field of the Invention

The present invention relates generally to a document production server and more particularly to a method and apparatus for modeling print job processing by a remote print shop.

2. Description of Related Art

Peak efficiency in the operation of a print shop requires modeling to be performed. Modeling provides the ability to determine efficient job routings, resource allocation, efficient scheduling and the like. As print shops continuously attempt to achieve ever higher levels of efficiency and utilization, the need for modeling increases. However, a print shop is faced with the problem of achieving this ability to model.

One way of obtaining this ability is to establish an in-house capability. For example, a print shop may purchase expensive software modeling tools from vendors or develop their own software and maintain specially trained and skilled personnel to maintain and carry out the modeling. For many print shops, if not all of them, this is practically impossible or too demanding.

Another alternative is for a print shop to hire an independent outside consulting service to visit the print shop and to provide a single set of recommendations for increasing efficiency. However, these consulting services can be fairly expensive and are generally used infrequently, if at all.

Conventional print shops are also organized in a manner that is functionally independent of the print jobs, the print job mix, and the total volume of print jobs passing through the system. Most commonly, equipment that is somewhat related is grouped together on a factory floor. This causes all printing equipment to be grouped in a single locale and, for example, all finishing equipment to be grouped in a separate locale. In other words, conventional print shops typically organize resources into separate departments, each department corresponding to a particular process that is performed in completing a print job.

When a print job arrives, the print job sequentially passes though each department. Once the print job is completely processed by a first department, the print job is placed in queue for the next department. The queue is sometimes in the form of a temporary storage facility. This process continues until the print shop makes its way through each department and is completed.

There are a number of limitations with conventional print shops. For example, the equipment employed in conventional print shops is not well interfaced with internal computer systems. In addition, the equipment is often physically organized in an inefficient arrangement.

Typical arrangements employ machines that require operators to load/unload jobs, monitor job progress, pass jobs on to a next station, and commence a next job. In between each of the steps, each job is commonly stored in a storage area awaiting the next step of the job. As a result, excess inventories may buildup and add to the costs of the job.

A physical job card is used to track progress of a job. The job card specifies the steps needed to be completed to finish the job. The job card also specifies the steps already completed, and the order in which steps are to be performed. The data regarding job completion is manually added to the job card, or sometimes is only remembered by the operators working on the job.

The lack of real time information concerning the contemporaneous state of the machines and the jobs leads to less efficient plant utilization, and lower productivity. Further, large jobs cannot easily be split into more efficient smaller job lots due to the difficulty in tracking the smaller job lots.

SUMMARY OF THE INVENTION

Embodiments of the present invention provide a centralized server for providing analytic services to print shops which are located remotely from the centralized server. In this manner, the remote print shop which apprises itself of the services offered by the methods and systems of the invention does not need to invest in the capital and labor necessary to provide modeling.

In an exemplary embodiment of the invention, a server is provided which is accessible to remote print shops via the Internet. The server is adapted to provide print job modeling, print shop design and organization services. The server may be accessible by skilled personnel and may be provided with up-to-date modeling and other analytical tools. The server may provide customized modeling services to many remote print shops simultaneously. The ability to access such modeling services provides a significant savings to a print shop when compared to the capital expenditures required of dedicated modeling services. A centralized location for the server enables the capital expenditure of the system to be shared by several remotely located print shops who subscribe to the system, thereby drastically reducing the cost to each print shop and without degrading the quality of modeling services available to the subscribing print shops.

Print shop managers may access the server which may be in communication with the equipment in their print shop and quickly determine the capacity of their print shop to handle new jobs. Over time, information about each remote print shop and the corresponding print jobs may be collected by the server and stored in a database. The collected information may then be used to analyze the mix of jobs performed by a remote print shop and the results of that analysis may be used to establish a more efficient print shop layout.

In a related patent application, U.S. patent application Ser. No. 09/706,430, filed on Nov. 3, 2000, a system and method for partitioning a print shop into autonomous cells is disclosed and in another related patent application, U.S. patent application Ser. No. 09/706,078, filed on Nov. 3, 2000, a system and method for coordinating production of document processing jobs among a plurality of autonomous cells is disclosed. The entire contents of these applications are incorporated herein by reference. A "cell" comprises at least one device for completing the document processing jobs. These print shops are known as "Lean Document Factories" which have substantially improved efficiencies and operating margins. Embodiments of the present invention provide a system and method for modeling and processing print jobs through these Lean Document Factories. Other embodiments of the present invention provide a system and method for partitioning remotely located print shops into autonomous cells using a central server and for remotely coordinating production of the document processing jobs through these cells.

In a Lean Document Factory, print jobs are partitioned into classes such that each autonomous cell contains sufficient resources to complete a print job of at least one class. Thus, for example, an autonomous cell may include equipment, such as multiple printers, a shrink wrapper and a computerized control system. A second autonomous cell may include different varieties of printers, cutters and copiers. The resources of these remotely located print shops have their resources intelligently divided and the system and method of the invention assigns print jobs to the autonomous cells for the purpose of modeling the processing of these jobs and/or for controlling the processing of these jobs.

The assignment of print jobs to autonomous cells at the remote print shop by the central server is done intelligently to provide desired load balancing and throughput. Moreover, print jobs are assigned to cells by the central server based on whether the cells have sufficient types of resources to complete the print job. The assignment of print jobs to the autonomous cells may be determined dynamically based upon the current queue of print jobs, current available capacity and current operating loads of the respective autonomous cells. The structure and composition of the cells themselves may be determined dynamically based upon the profile of jobs to be performed by the remote print shop at any given time.

The print job is sent to a selected one of the autonomous cells at the remote print shop that has equipment for completing the print job. Alternatively, the print job may be divided into lots by the central server and the lots are concurrently processed either on separate items of equipment in the selected autonomous cell or in separate cells.

Embodiments of the system of the invention may include a work flow mapping module at the central server that determines a work flow of the document processing jobs at a remotely located print shop. The printing work flow system at the central server may also include a job description module for splitting the various document processing jobs into sub-jobs. A print cell controller may be provided at selected one of the cells for receiving at least one sub-job and for further splitting the sub-job into lots for processing among devices in the selected cell.

In accordance with an additional aspect of the invention, embodiments of the present invention are provided with a central server for assigning sub-jobs to available cells at a remote print shop in a priority work flow system for printing a product-type. The method entails identifying the maximum capacity of the available cells to print the product type. The current capacity of each of the available cells to print product type is communicated and identified by the central server. Based on the maximum capacity and current loading of each of the available cells, a current capacity of each of the available cells for printing the product-type is determined by the server. At least one of the available cells is assigned for printing.

In accordance with another aspect of the present invention, a method is practiced by the central server for reorganizing a remotely located print shop. The system analyzes the current print shop organization and the print jobs that are to be produced by the print shop, and the operations required for each of the identified jobs are specified to the server. A determination is made by the server to specify the print shop resources that are received or required for the identified operations. A determination is also made to specify the print shop resources that are required for operations to produce the product based on customer demand for the products. The print shop resources may then be reorganized and/or partitioned into autonomous cells based on the determined number of print shop resources required for operations to produce print jobs based on customer demand. Each autonomous cell is independently capable of performing at least one of the identified print jobs. This organization of the print shop is re-examined and re-optimized repeatedly as the customer demand for print jobs changes. For example, the server may store print shop organization information in a database and may receive parameters regarding a mix of expected print jobs, based upon this information the system may suggest revisions to the print shop organization to more effectively handle the expected print job mix.

DETAILED DESCRIPTION OF EXEMPLARY EMBODIMENTS

In the operation of embodiments of the invention, the remote print shop being modeled is organized in accordance with lean document factory principles. In a lean document factory, large jobs are split into smaller batches and then these batches are processed sequentially so that the entire job "flows" through all steps of the production process until the job is finished. To ensure smooth production flows without bottlenecks, it is necessary to determine how many resources should be allocated to each step of the production process. This is determined by constructing models of the job and running the models to determine overall performance. When a job is acquired by a printing facility, it is necessary to determine the most efficient way of performing the job using the "small-batch continuous flow controlled approach" while considering some restrictions on available resources. In simpler cases, analytical models can be constructed and when these are not possible, simulation models need to be used.

The centralized server works with remotely located print shops to develop appropriate models and provide them with user interfaces to specify the parameters for running the models. The user interface permits a manager of the print shop to enter parameters which are appropriate for a specified modeling application and to transmit these parameters to the central server. This service enables the print shop personnel to optimize and improve the production parameters before initiating production. This is a very useful service especially if the job is a repetitive one (i.e. it repeats itself with different parameters). In this first example, a simulation is used along with an analytical model, specifically using a third-party simulation software such as Arena (available from Rockwell Software in Sewickley, Pa.). However, it is to be understood that any modeling program may be made accessible on the central server for the remotely located print shops using the systems and methods of the invention. The architecture, therefore, involves a production model that executes on the server 16 as shown in FIG. 1.

Figure 1:
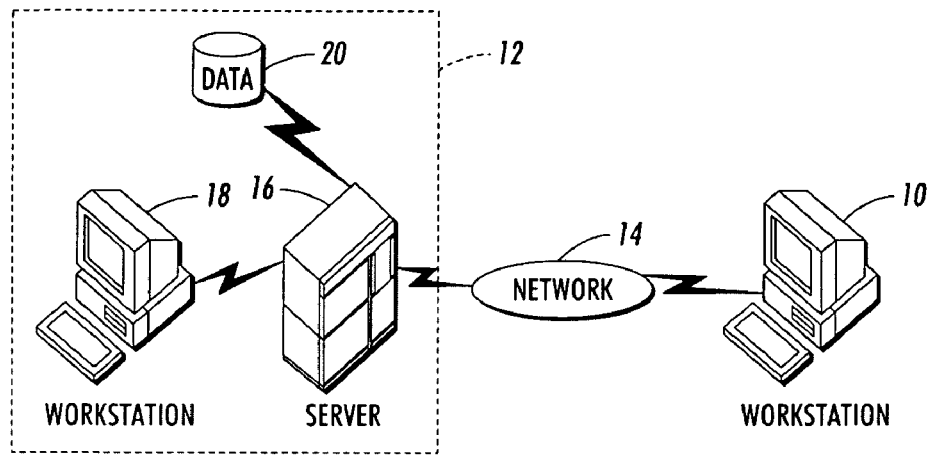
FIG. 1 shows schematic diagram of a method and system for modeling print jobs in accordance with the invention.

FIG. 1 shows a workstation 10 at a remotely located print shop in communication with a modeling system 12 via a network 14. Although, FIG. 1 only shows a single remote workstation 10, it is understood that any number of workstations 10 may communicate with the modeling system 12 and services may be provided to all of these workstations 10. The modeling system 12 includes a server 16, a server workstation 18 and a database 20. A print shop manager may use the remote workstation 10 to input data (parameters) regarding the remote print shop and print jobs. This data may include information regarding the number of individual items in the job; parameters describing the print-job such as number of pages in each item, job name, job identifier, etc; parameters describing the resource requirements at each stage of the production process (such as printing capacity, finishing device capacity, the number of available operators, etc.); statistical parameters describing the process required to complete the job (such as failure history, repair history, resource performance fluctuations, difference in performance across operators and resource material related dependencies, etc); job control information such as batch size or the number of batches to use, the inter-process buffer size, type and parameters of the control policy; and the production costs per unit time used for each resource; resource parameters such as machine and labor cost and the like and material parameters such as paper type, cost, size and the like. The control policy including information such as a scheduling algorithm, prioritization of print jobs and allocation of resources to those jobs. In response to the input of this data, the server may execute a model of the print job flowing through the print shop and generate output data. This data may include the bottleneck process for the given set of parameters; the turnaround time for the job; estimates of the optimal batch size to use; estimates of the total cost of producing the job; suggested optimal parameters to use for the control policy and the like.

Figure 2:
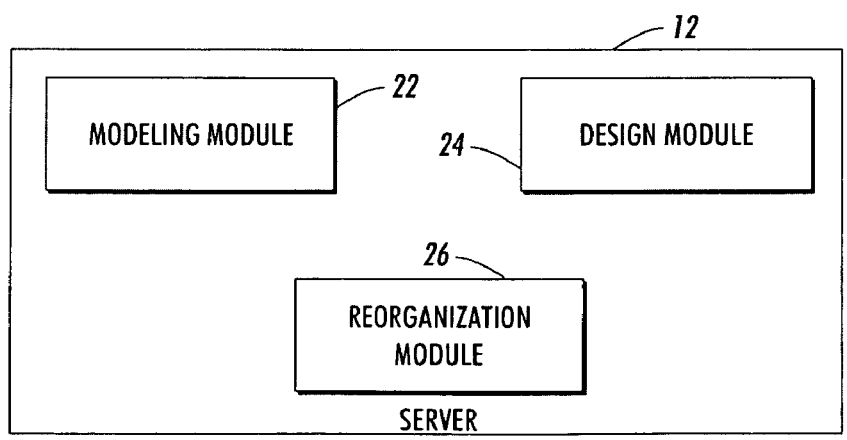
FIG. 2 shows a schematic detail view of a server of the system shown in FIG. 1.

FIG. 2 shows a schematic diagram of a server 12 in accordance with embodiments of the invention. The server 12 includes a modeling module 22, a design module 24 and a reorganization module 26. The modeling module 22 is adapted to execute at least one of several print job modeling programs. This modeling program may be located on the server 12 in the modeling module 22 for indirect access through the use of an exemplary embodiment of the invention. The software modules may be continuously updated at the server without requiring similar updates at each print shop that uses the system. This can result in a significant savings for the print shop, without a sacrifice in modeling ability. It is contemplated that these and other modules may be provided to the server 12 without limitation as long as the modules may be of service to a remote print shop.

Figure 3:
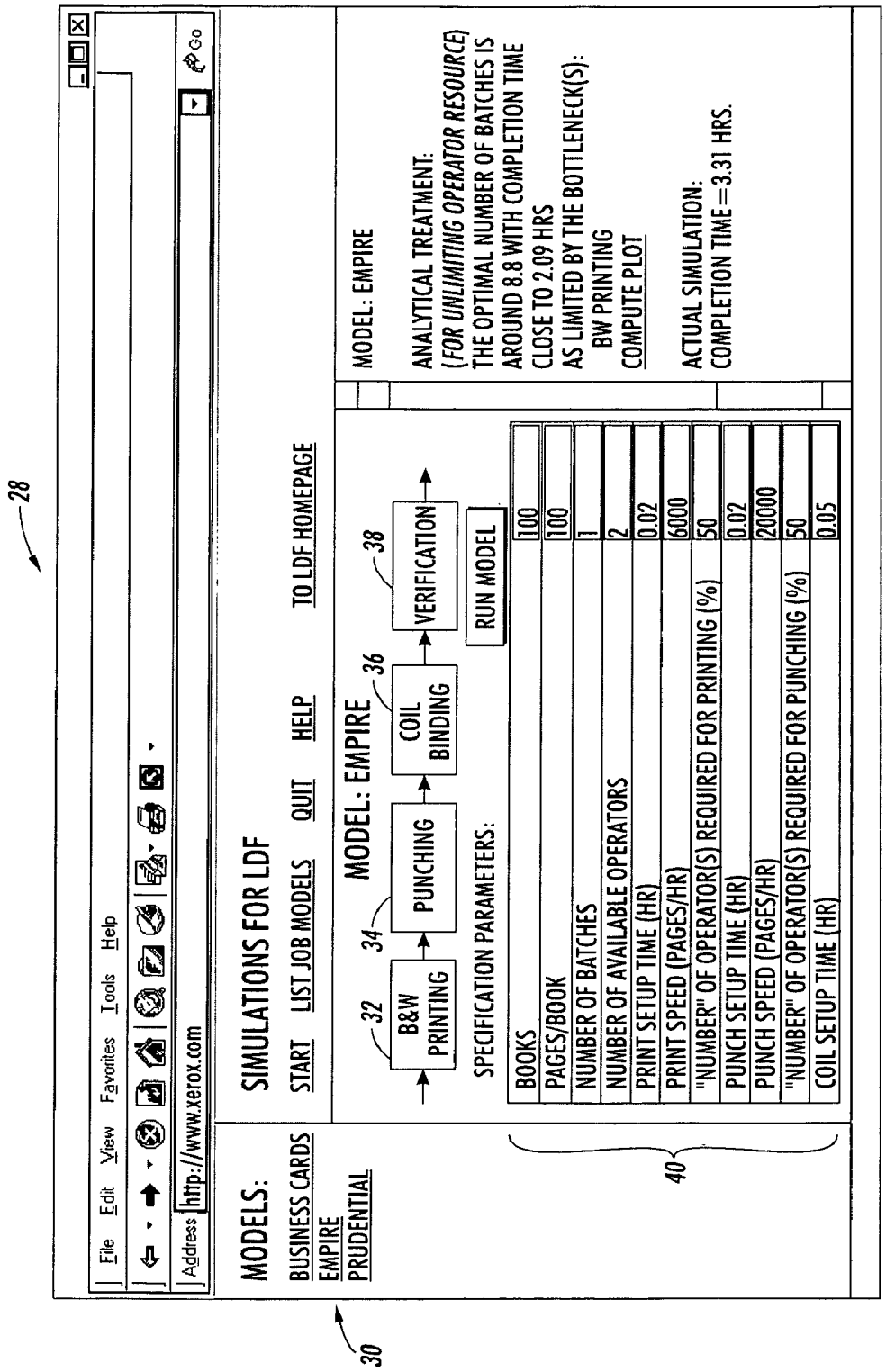
FIG. 3 shows a first exemplary user interface for the method and system for modeling print jobs of FIG. 1.

FIG. 3 shows an exemplary user interface 28 having an Empire job family model 30 that is frequently processed by a remote print shop. The user interface 28 is a displayable file having multiple input fields. The job 30 requires production and shipment of coil bound books to individual customers. The processes required to produce the book are sequential and include black-and-white printing 32, punching 34, coil binding 36 and verification 38. The production processes needed to produce this job do not change on a daily basis. However, the number of books to be printed and the number of pages per book vary an a day-to-day basis. If one were to produce this book using small batches in a controlled pull framework, it would require determination of optimal batch size as well as the number of resources to deploy at each stage of the production process to ensure smooth production without bottlenecks. The modeling program is accessed by the remote print shop using the user interface 28 to determine these and other parameters, such as the number of printers to use, number of finishers to use and the like.

Since the job of FIG. 3 is produced at a regular frequency, a model of this job can be constructed by experts at the remote server 12 as a part of the service to the remote print shop and stored on the database 20. The user interface 28 is presented to the print shop as shown in FIG. 3. Each day as jobs arrive the print shop, personnel can supply the parameters 40 of the job through the interface 28, execute the model remotely on the central server and perform extensive what-if studies on the specific order.

Figure 4:
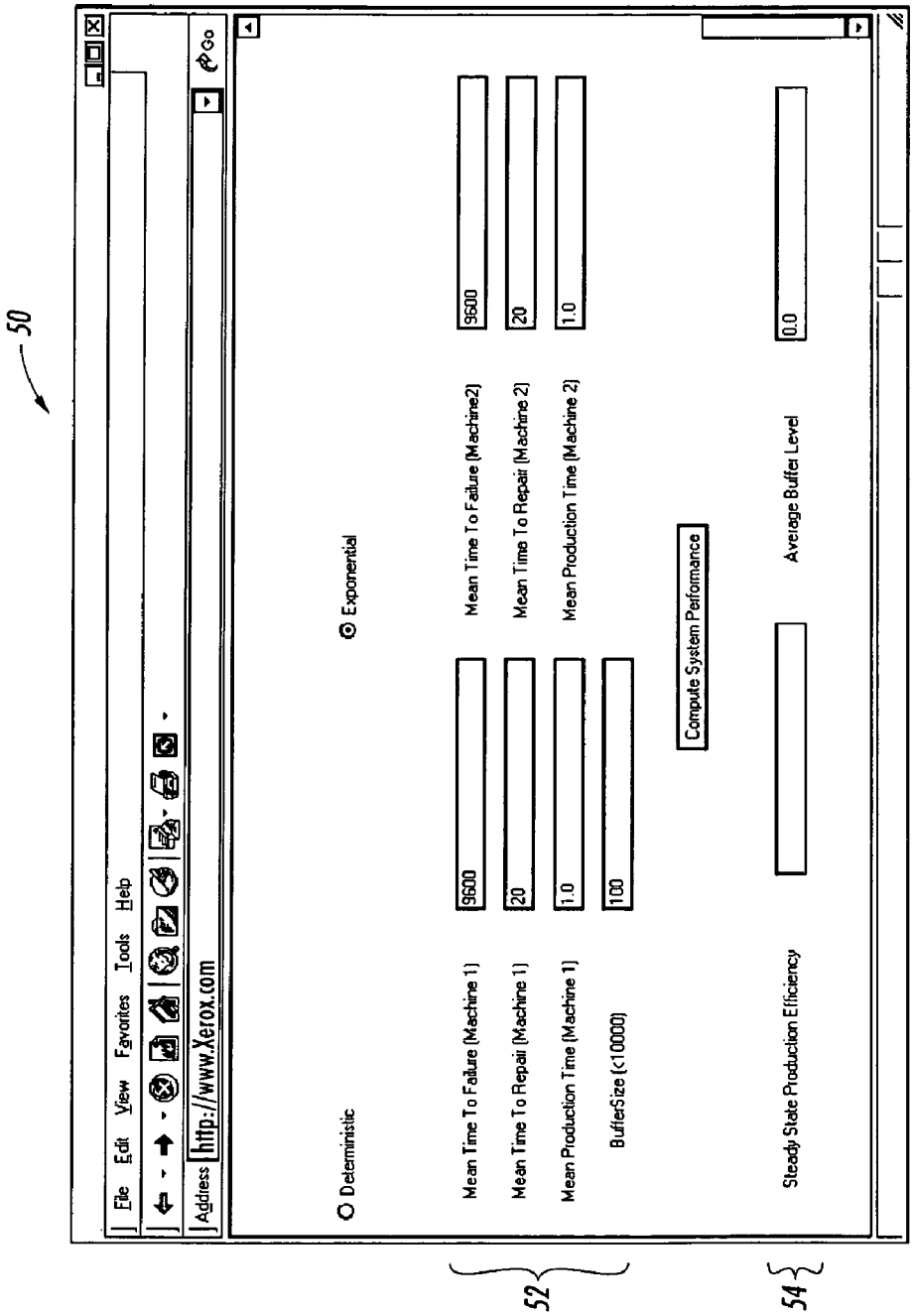
FIG. 4 shows a second exemplary user interface for the method and system for modeling print jobs of FIG. 3.

In other embodiments, in operation the model executes on the client side. FIG. 4 shows a second exemplary user interface 50 for this second exemplary operation of a service for computing optimal buffer size in a production process using a JAVA applet. While the server 12 hosts a web-site for providing the modeling service, when the client specifies job parameters 52 through the user interface 50, the model program is forwarded to the client workstation 10, runs on the client workstation 10 and displays the results 54 of the model.

In accordance with other embodiments of the system of the invention, modeling services may also be provided using a mixture of client-side and server-side processing. The remote client is not likely to see any real difference except for possible transit time delays.

With the present invention, remotely located print shops are able to receive a customized high-level analysis of the shop operations both on the short-term and long-term scales without hiring extra personnel and perhaps, by eliminating some currently held positions, at a substantial savings. Other types of modeling services may also be provided to support the interaction between the print shop and end customers, as well as, between print shops. The centralized services offered by the invention are less expensive to carry out than if the individual print shops were required to carry out these services on their own.

As shown in FIG. 2, in addition to the modeling services provided by the modeling module, other services may be provided by embodiments of the invention, including, without limitation, print shop design and reorganization services. While the modeling module 22 is adapted to receive print shop organization parameters and print job parameters to determine the most efficient method of processing the print job, the design module 24 may be adapted to monitor the equipment within the remote print shop over a period of time. The design module 24 may be adapted to track the performance of the print shop and store that performance data in the database 20. The design module 24 may then invoke a design program to analyze the performance of data and to suggest revisions to the print shop. For example, the design program 24 may analyze the performance data and determine that a bottleneck exists which might be remedied by an adjustment and/or change of equipment in the print shop. Additionally, the reorganization module 26 may be adapted to analyze the current print shop configuration and receive parameters regarding a change in print job mix at the print shop and make suggestions for reorganizing the print shop. For example, the reorganization module 26 may analyze the parameters of the new print job mix and the current organization of the print shop and suggest the relocation of equipment and/or an adjustment to the cells in the lean document factory of the print shop. The reorganization module 26 may also be adapted to track information about the print shop and/or the mix of print jobs to make suggestions for future revisions to the print shop based upon the current mix of print jobs or based upon an expected mix of print jobs and the associated parameters.

While the embodiments of the invention have been described above as providing access to the server via a network such as the Internet, it is to be understood that the invention is not limited in this manner. It is to be understood that the print shop may access the server via any form of communication and still practice the invention as long as the server is capable of automatically providing output to the print shop via the same or another form of communication. For example, access to the server may be provided using the public telephone system, via email, and/or via a facsimile based communications system and the like.

Additionally, while the above disclosure may have described print job parameters in the singular it is understood that multiple print jobs may also be modeled and still form a part of the invention.

Furthermore, the disclosed method may be readily implemented in software using object or object-oriented software development environments that provide portable source code that can be used on a variety of computer or workstation hardware platforms. Alternatively, the disclosed modeling system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The modeling systems and methods described above, however, can be readily implemented in hardware and/or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java® or CGI script, as a resource residing on a server or graphics workstation, as a routine embedded in a dedicated electronic message management system, a web browser, an electronic message enabled cellular phone, a PDA, a dedicated computer controlled display system, or the like. The modeling system can also be implemented by physically incorporating the system and method into a software and/or hardware system, such as the hardware and software systems of a dedicated computer controlled display system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A system for assessing performance of at least part of at least one print production facility, the at least part of the at least one print production facility including one or more print related devices, comprising:
    a workstation operatively associated with the at least one print production facility, the workstation being adapted for receiving print job and print shop design parameters for a repetitive print job, wherein the repetitive print job is performed on a routine basis;
    a server remotely located from and in operative communication with the workstation, the server being adapted to use the parameters transmitted from the workstation for constructing and storing a model for regularly processing the repetitive print job;
    a display with the workstation, the display being adapted to display a number of resources to allocate for each stage of a repetitive production process based on the constructed model;
    an interface for operation with the workstation, the interface being adapted to receive select parameters for executing the constructed model for producing a repeat one of the repetitive print job; and,
    a processor being adapted for electronically performing at least one simulation with the select parameters in accordance with the constructed model, the processor being further adapted to analyze the each stage for determining a number of resources to deploy at the each stage;
    wherein the display further displays at least one value for indicating at least one of an optimal batch size and the number of resources to deploy.

2. The system of claim 1, wherein the model is further based on at least one of setup time, batch size, and number of operators.

3. The system of claim 1, in which the server includes the processor, wherein the simulation is performed at the server.

4. The system of claim 3, in which the network communicatively couples two or more print production facilities, wherein a first model is provided for one of the two or more print production facilities based on a first set of print related parameters provided from the one of the two or more print production facilities, and a second model is provided for another one of the two or more print production facilities based on a second set of print related parameters from the other of the two or more print production facilities.

5. The system of claim 1, in which the at least part of the at least one print production facility corresponds with the one or more stages, wherein the at least one value corresponding with the analyzing of the one or more stages includes an amount of time required to execute the print job.

6. The system of claim 1, wherein the system is adapted to perform multiple simulations with multiple sets of user settable values for determining an efficient way of executing the print job.

7. The system of claim 6, wherein the efficient way of executing the print job is obtained by one of changing and adding one or more print production facility resources.

8. The system of claim 1, wherein a plurality of models is made available to the at least one print production facility, a plurality of indicators corresponding with the plurality of models is displayed on the display of the user interface, and a workflow displayed on the display of the user interface corresponds with the one of the plurality of indicators selected by the user.

9. A method of assessing performance of at least part of at least one print production facility, the at least part of the at least one print production facility including one or more print related devices, comprising:
    receiving at a server a plurality of print job related parameters for a repeat print job input at the at least one print production facility, the server communicating with and being remotely located from the at least one print production facility, wherein the repeat print job is performed on a routine basis;
    providing a model, constructed at the server, for regularly producing the print job, the model constructing stages of a production process;

displaying the model at the at least one print production facility;

receiving select parameters for producing a select one job of the repeat print job;

performing by a processor at least one simulation of the model using the received select parameters;

analyzing at the server the constructed stages for determining for the select one job at least one of a number of resources or a batch size to deploy at each stage; and, displaying at least one value at the at least one print production facility including the at least one of the number of resources or the batch size.

10. The method of claim 9, wherein the plurality of print job related parameters includes at least one of setup time, batch size, and number of operators.

11. The method of claim 9, wherein the simulation is performed at the server.

12. The method of claim 9, in which the network communicatively couples two or more print production facilities, wherein a first model is provided for one of the two or more print production facilities based on a first set of print related parameters provided from the one of the two or more print production facilities, and a second model is provided for another one of the two or more print production facilities based on a second set of print related parameters from the other of the two or more print production facilities.

13. The method of claim 9, in which the at least part of the at least one print production facility corresponds with the one or more cells, wherein the at least one value corresponding with the analyzing of the one or more stages includes an amount of time required to execute the print job.

14. The method of claim 9, wherein a plurality of models is made available to the at least one print production facility, a plurality of indicators corresponding with the plurality of models is displayed on the display of the user interface, and a workflow displayed on the display of the user interface corresponds with the one of the plurality of indicators selected by the user.

15. The method of claim 9, wherein the using of the processor to perform the at least one simulation includes performing multiple simulations with multiple sets of user settable values for determining an efficient way of executing the select one job of the repeat print job.

16. The method of claim 15, wherein the efficient way of executing the select one job of the repeat print job is obtained by one of changing and adding one or more print production facility resources.

17. A method of assessing performance of at least part of a print production facility, comprising:

providing at a server a plurality of print shop related parameters for a repeat print job input at the at least one print production facility, the server communicating with and being remotely located from the at least one print production facility, wherein the repeat print job is performed on a routine basis;

constructing a model at the server for regularly producing the repeat print job, the model constructing stages of a production process by allocating resources to cells based on the print shop related parameters;

displaying on a display the model at the at least one print production facility for producing a select one job of the repeat print job;

performing by a processor at least one simulation of the model for the select one job, analyzing by the processor the resources of the constructed stages using tracked performance data, and determining for the select one job at least one cell for producing the select one print job using the at least one simulation and the tracked performance data; and, indicating the at least one cell on a display.

18. The method of claim 17 further indicating on the display one or both of steady state production efficiency and average buffer level.

19. The method of claim 17, wherein one of the plurality of print shop related parameters includes a job parameter.

20. The method of claim 19, wherein the providing includes transmitting a set of information for one machine including at least one of mean time to failure, mean time to repair, mean production time, and buffer size.

21. The method of claim 20, wherein the providing further includes transmitting a set of information for another machine, the information including at least one of mean time to failure, mean time to repair, mean production time, and buffer size.

22. The method of claim 17, wherein the modeling program comprises a JAVA applet.

* * * * *